US008009963B2

(12) United States Patent
Panda et al.

(10) Patent No.: US 8,009,963 B2
(45) Date of Patent: *Aug. 30, 2011

(54) ADAPTIVE FILTERING TO ENHANCE VIDEO BIT-RATE CONTROL PERFORMANCE

(75) Inventors: Prasanjit Panda, San Diego, CA (US); Khaled Helmi El-Maleh, San Diego, CA (US); Hsiang-Tsun Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1520 days.

This patent is subject to a terminal disclaimer.

(21) Appl. No.: 11/378,567

(22) Filed: Mar. 16, 2006

(65) Prior Publication Data

US 2007/0172211 A1 Jul. 26, 2007

Related U.S. Application Data

(60) Provisional application No. 60/763,148, filed on Jan. 26, 2006.

(51) Int. Cl.
*H04N 9/80* (2006.01)
*H04N 5/78* (2006.01)
*H04N 5/93* (2006.01)
*H04N 5/917* (2006.01)
*H04N 9/65* (2006.01)
*H04N 9/67* (2006.01)
*H04N 9/77* (2006.01)
*H04N 11/02* (2006.01)
*H04N 11/20* (2006.01)
*G06F 17/00* (2006.01)
*G10L 21/04* (2006.01)

(52) U.S. Cl. ........ 386/248; 386/285; 386/323; 386/328; 348/417.1; 348/450; 348/452; 348/642; 348/712; 348/713; 375/240.06; 375/240.12; 375/240.16; 375/240.25; 375/240.29; 700/94; 703/500; 703/503

(58) Field of Classification Search .................. 386/112, 386/96, 104, 109, E9.001, E9.029; 348/450, 348/452, 642, 660, 663, 712, 713, E9.036, 348/E9.053, E11.016, E11.021, 417.1; 375/240.16, 375/240.29, E7.125, E7.129, E7.133, E7.135, 375/E7.145, E7.154, E7.185, E7.189, E7.199, 375/E7.211, E7.263, 240.06, 240.12, 240.25, 375/417.1, E7.19, E7.201, E7.241; 700/94; 704/500, 503
See application file for complete search history.

(56) References Cited

U.S. PATENT DOCUMENTS 5,784,115 A * 7/1998 Bozdagi ........................ 348/452
(Continued)

FOREIGN PATENT DOCUMENTS

EP 0593099 4/1994
(Continued)

OTHER PUBLICATIONS

International Search Report and Written Opinion—PCT/US2007/061170, International Search Authority—European Patent Office—Jan. 2, 2008.

*Primary Examiner* — Thai Tran
*Assistant Examiner* — Syed Y Hasan
(74) *Attorney, Agent, or Firm* — Timothy F. Loomis; John G. Rickenbrode (57) ABSTRACT

This disclosure describes adaptive filtering techniques to improve the quality of captured imagery, such as video or still images. In particular, this disclosure describes adaptive filtering techniques that filter each pixel as a function of a set of surrounding pixels. An adaptive image filter may compare image information associated with a pixel of interest to image information associated with a set of surrounding pixels by, for example, computing differences between the image formation associated with the pixel of interest and each of the surrounding pixels of the set. The computed differences can be used in a variety of ways to filter image information of the pixel of interest. In some embodiments, for example, the adaptive image filter may include both a low pass component and high pass component that adjust as a function of the computed differences.

38 Claims, 8 Drawing Sheets

U.S. PATENT DOCUMENTS

| | | | |
|---|---|---|---|
| 5,835,375 A * | 11/1998 | Kitamura | 700/94 |
| 5,844,629 A * | 12/1998 | Murray et al. | 348/642 |
| 5,982,441 A * | 11/1999 | Hurd et al. | 348/417.1 |
| 6,243,144 B1 * | 6/2001 | Callway | 348/666 |
| 6,507,615 B1 | 1/2003 | Tsujii | |
| 7,099,389 B1 * | 8/2006 | Yu et al. | 375/240.12 |
| 7,492,820 B2 | 2/2009 | Puri | |
| 2003/0152146 A1 * | 8/2003 | Lin et al. | 375/240.16 |
| 2004/0228538 A1 | 11/2004 | Onuma et al. | |
| 2005/0123038 A1 | 6/2005 | Otsuka | |
| 2006/0018378 A1 | 1/2006 | Piccinelli | |
| 2006/0209949 A1 | 9/2006 | Fukuta | |
| 2007/0172211 A1 | 7/2007 | Panda | |

FOREIGN PATENT DOCUMENTS

| | | |
|---|---|---|
| EP | 0984634 | 3/2000 |
| EP | 1515563 | 3/2005 |
| EP | 1603338 | 12/2005 |
| JP | 2002247576 | 8/2002 |
| JP | 2004297768 A | 10/2004 |
| JP | 2006005572 A | 1/2006 |
| WO | WO2004082290 | 9/2004 |

\* cited by examiner

ADAPTIVE FILTERING TO ENHANCE VIDEO BIT-RATE CONTROL PERFORMANCE

TECHNICAL FIELD

RELATED APPLICATIONS

This application claims the benefit of provisional U.S. Application Ser. No. 60/763,148, entitled "VIDEO SYSTEMS, VFE SYSTEMS," filed Jan. 26, 2006, and is related to U.S. application Ser. No. 11/384,106, entitled ADAPTIVE FILTERING TO ENHANCE VIDEO ENCODER PERFORMANCE, filed on Mar. 16, 2006 each assigned to the assignee of the present application, and incorporated herein by reference in its entirety for all purposes.

This disclosure relates to image processing and, more particularly, video encoding.

BACKGROUND

A variety of video encoding standards support improved recording or transmission efficiency of video sequences by encoding data in a compressed manner. The Moving Picture Experts Group (MPEG), for example, has developed a number of standards including MPEG-1, MPEG-2 and MPEG-4. Other examples include the International Telecommunication Union (ITU) H.263 standard, and the emerging ITU H.264 standard. These video encoding standards generally support improved recording and transmission efficiency of video sequences by encoding data in a compressed manner.

Compression reduces the overall amount of data that needs to be recorded or transmitted for effective reproduction of the video frames. To promote efficiency, the video encoder may adhere to a target bit rate that specifies the number of coding bits that should be allocated to each frame in a video sequence. The video encoder may overshoot the target bit rate for some frames, e.g., due to high complexity caused by excessive motion or texture in the video frame. In this case, the video encoder may skip encoding of some frames in order to conserve coding bits for other frames in the sequence. Excessive frame skipping may cause undesirable artifacts, such as jerkiness, in the encoded video.

SUMMARY

This disclosure describes adaptive pre-filtering techniques to enhance video encoder performance. An adaptive pre-filter may be implemented in the video front end (VFE) of a video recording system. The VFE generates video from light captured by a sensor, and passes the video to a video back end (VBE). The VBE encodes the video before the video is transferred to a storage and/or transmission medium.

A control unit adaptively configures the adaptive pre-filter in the VFE based on performance feedback from the video encoder in the VBE. In this manner, the video recording system determines an appropriate configuration of the adaptive pre-filter to enhance performance of the VBE. The adaptive pre-filter may be a luminance filter. In some embodiments, the pre-filter may be a luminance filter, a chrominance filter, or a combined luminance-chrominance filter.

The adaptive pre-filter may be configured to filter out information from the video to reduce video complexity, and thereby enhance video encoder performance by reducing bit-rate overflow and/or underflow. Alternatively, the adaptive pre-filter may be configured to enhance the subjective visual quality of the encoded video recorded by the system. Also, in some embodiments, the adaptive pre-filter may be configured to both reduce bit-rate overflow and/or underflow and enhance visual quality of the encoded video. In each case, performance feedback from the VBE is used to adapt the characteristics of the pre-filter in the VFE. The characteristics of the pre-filter may be adapted on a continuous or periodic basis to maintain desired VBE performance levels.

In one embodiment, the disclosure provides a method comprising applying a filter to a video frame, applying a video encoder to encode the filtered video frame, receiving performance information relating to the video encoder, and adjusting the filter based on the performance information.

In another embodiment, the disclosure provides a system comprising a video sensor that obtains a video frame, a filter that filters the video frame, a video encoder that encodes the filtered video frame, and a control unit that receives performance information relating to the video encoder, and adjusts the filter based on the performance information.

In a further embodiment, the disclosure provides a computer-readable medium comprising instructions to cause a processor to apply a luminance filter to a video frame, apply a video encoder to encode the filtered video frame, receive performance information relating to the video encoder, and adjust the filter based on the performance information.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
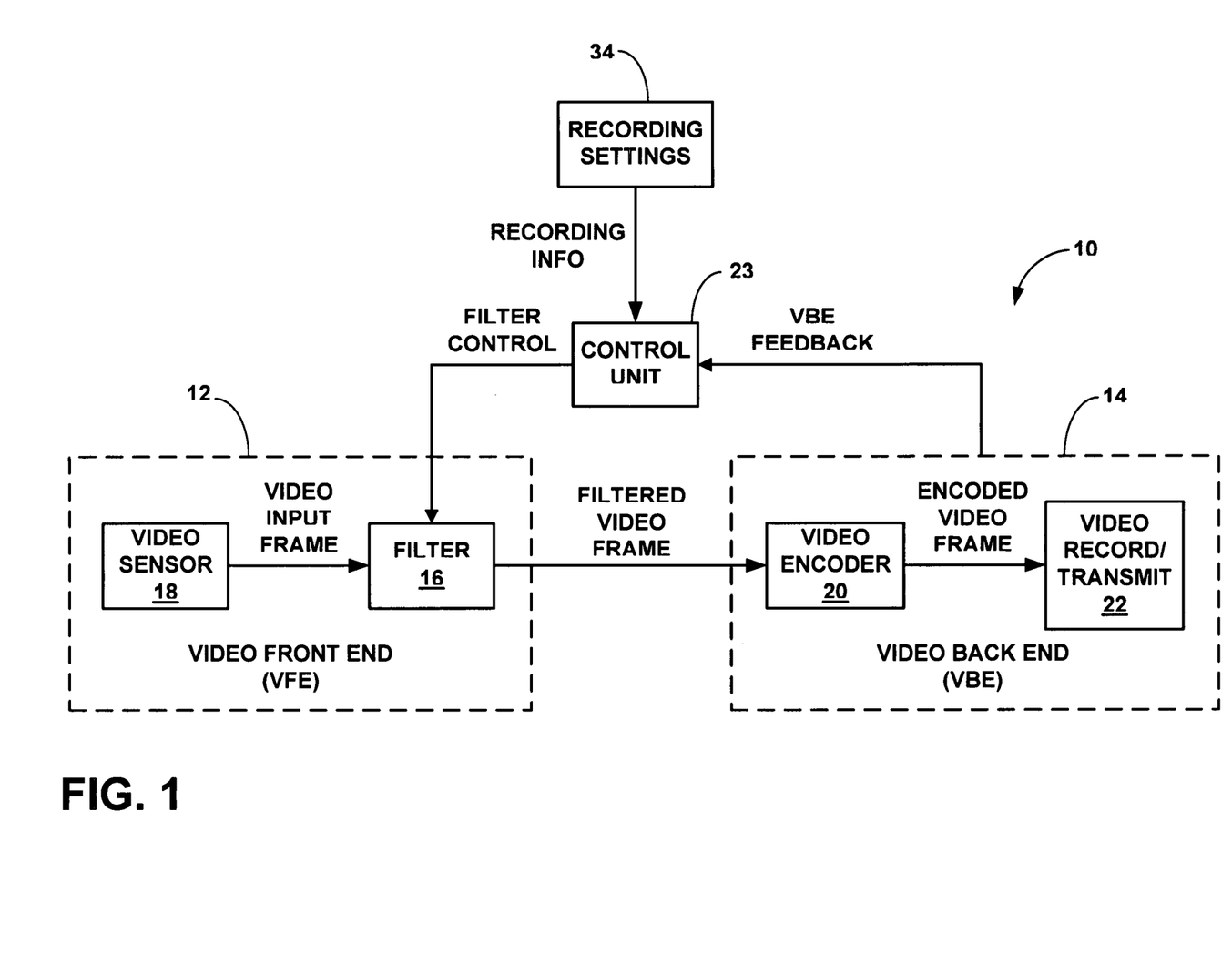
FIG. 1 is a block diagram illustrating a video recording system including a video front end (VFE) with a pre-filter that is adjusted based on feedback from a video back end (VBE).

FIG. 1 is a block diagram illustrating a video recording system 10 including a video front end (VFE) 12 and a video back end (VBE) 14. VFE 12 includes a filter 16 and a video sensor 18. VBE 14 includes a video encoder 20 and a video record/transmit device 22. System 10 further includes recording settings unit 34, which indicates settings selected for recording a video sequence. Video sensor 18 obtains video frames and passes the frames to filter 16. Filter 16 may be a digital luminance filter that can be applied to filter luminance values associated with pixels in the video frames. In some embodiments, filter 16 may be a chrominance filter, include both a luminance filter and chrominance filter, or be a combined luminance/chrominance filter. Video encoder 20 encodes the filtered video frames according to any of a variety of encoding techniques. A luminance filter will be described herein for purposes of illustration. Video record/transmit device 22 may store the encoded video for later retrieval or transmission, or transmit the encoded video to another device, e.g., via a direct connection or network connection. The transmission medium may be a wired or wireless medium.

In general, system 10 provides an adaptive pre-filter 16 in VFE 12, which is configurable based on feedback from VBE 14 to determine an appropriate configuration of the filter. A control unit 23 receives VBE feedback indicating video encoder performance information, as well as recording information from recording settings unit 34. The recording information may include video frame size, video encoding bit-rate, and frame rate in frame per second (fps). The VBE feedback may include encoder performance information such as frame variance and bit-rate control information. Control unit 23 generates filter control information to adjust characteristics of luminance filter 16 based on the VBE performance information, the recording information, or both.

VFE 12 generates video frames from light captured by sensor 18 and then passes the video frames onto VBE 14 for encoding. Video recording system 10 of FIG. 1 further incorporates filter 16, however, which operates as an adaptive pre-filter that is configurable based at least in part on VBE feedback. Using VBE feedback, which may include a variety of performance information, control unit 23 determines an appropriate configuration of luminance filter 16 to promote enhanced performance of video encoder 18. As shown in FIG. 1, control unit 23 also may be responsive to recording information within video recording system 10, as provided by recording settings unit 34.

Control unit 23 and adaptive luminance filter 16 may be used, in some embodiments, to enhance video encoding performance by reducing video complexity in the incoming video prior to encoding. With reduced video complexity, a video frame may require less coding bits in video encoder 18. As a result, adaptive luminance filter 16 may reduce the amount of bit-rate overflow and/or underflow in video encoder 18. In other embodiments, control unit 23 and adaptive luminance filter 16 may be used to enhance the subjective visual quality of the video encoded by video encoder 18. In further embodiments, control unit 23 and adaptive luminance filter 16 may be used to support both reduction in bit-rate overflow and/or underflow and enhancement of subjective visual quality. In each case, using VBE feedback and recording information, control unit 23 adjusts the operation of VFE 12 based on conditions within VBE 14 and recording settings.

The features illustrated in FIG. 1 may be realized by any suitable combination of hardware, firmware and/or software components. In addition, recording settings unit 34, VFE 12 and VBE 14 may include a variety of additional components not shown in FIG. 1. For ease of illustration, FIG. 1 shows particular components useful in encoding video frames with reduced bit-rate overflow and/or underflow and/or enhanced subjective visual quality, in accordance with this disclosure. Depiction of different features in FIG. 1 as units is intended to highlight different functional aspects of image recording system 10, and does not necessarily imply that such units must be realized by separate hardware, firmware and/or software components. Rather, in some embodiments, functionality associated with one or more units may be integrated within common hardware, firmware and/or software components.

Video recording system 10 may be a digital camera, such as a digital video camera. In addition, video recording system 10 may be a stand-alone device, such as a stand-alone camera, or be integrated in another device, such as a wireless communication device. As an example, in some embodiments, video recording system 10 may be integrated in a mobile telephone to form a so-called camera phone or video phone. Video recording system 10 preferably is equipped to capture color imagery, black-and-white imagery, or both. In other embodiments, video recording system 10 may be integrated within a video camcorder.

Video sensor 18 acquires video information for a scene of interest and generates video frames. Video sensor 18 may comprise, for example, an array of solid state sensor elements such as complementary metal-oxide semiconductor (CMOS) sensor elements, charge coupled device (CCD) sensor elements, or the like. In addition, video sensor 18 may include color filters to separate the video information into color components. Each pixel obtained by video sensor 18 has a luminance value, i.e., intensity level, as well as chrominance values. The video information for each pixel may be represented by YCbCr (luminance, blue chrominance, red chrominance) values, or by other device-independent or device-dependent color space values. Luminance filter 16 is equipped to filter the luminance values associated with the pixel data, e.g., to smooth or sharpen the video frame. The characteristics of luminance filter 16 are adjustable in response to feedback from VBE 14.

VBE 14 receives the filtered video frame from VFE 12 and performs any necessary video processing on the filtered video frame. VBE 14 may include, for example, video processing modules configured to perform cropping, demosaicing, compression, image enhancement, or other processing of the video information captured by video sensor 20. Various components of VFE 12 and VBE 14 may be realized by one or more processors, such as one or more microprocessors, digital signal processors (DSPs), application specification integrated circuit (ASICs), field programmable gate arrays (FPGAs), or any other equivalent discrete or integrated logic circuitry.

Video encoder 20, which forms part of VBE 14, may form part of an encoder-decoder (CODEC) that encodes the filtered video frames obtained from VFE 12 according to a particular encoding technique or format, such as MPEG-2, MPEG-4, ITU H.263, ITU H.264, or the like. Video encoder 20 encodes and compresses the video frames for storage or transmission via video record/transmit device 22. Video record/transmit device 22 may include a data storage medium, such as a magnetic disk or tape, optical disk or tape, or solid state memory, for storing the video. Alternatively, or additionally, video record/transmit device 22 may include a wired or wireless transmission medium. In either case, video record/transmit device includes suitable electronic and/or software components to support data storage and/or transmission. The stored or transmitted video information also may be accompanied by audio information.

Video encoder 18 ordinarily has a target bit-rate that indicates the number of bits to be allocated to each video frame in a sequence of frames. Control unit 23 may set the target bit-rate as part of a video encoding rate control mechanism. The target bit-rate may be specified for an entire video sequence, or on a frame-by-frame basis. In either case, for some recordings, the amount of bits generated by video recording system 10 for a video frame can overshoot the target bit-rate by more than what is deemed an acceptable amount. If video recording system 10 includes a frame skipping mechanism, encoding of some video frames may be skipped in order to conserve coding bits when video encoder 20 substantially overshoots the target bit-rate.

An excessive amount of bit-rate overflow may cause video encoder 20 to skip encoding of several frames. Unfortunately, excessive frame skipping may cause jerkiness or other artifacts in the recorded video, reducing video quality. Reducing the complexity of the video information by application of filter 16 may be effective in reducing the amount of bit-rate overflow and associated frame skipping. In particular, filter 16 can be used to pre-filter the video to reduce video complexity prior to encoding by video encoder 20. With luminance pre-filtering, video encoder 20 receives a less complex video frame, e.g., with smoothed edges in the case of low pass filtering. If there is significant bit-rate underflow, i.e., encoder 20 requires less coding bits than the applicable bit rate permits, filter 16 may be adjusted to provide a high-pass filter that provides a sharper image. In the case of bit-rate underflow, encoder 20 can afford a greater number of encoding bits for the sharpened image.

Figure 2:
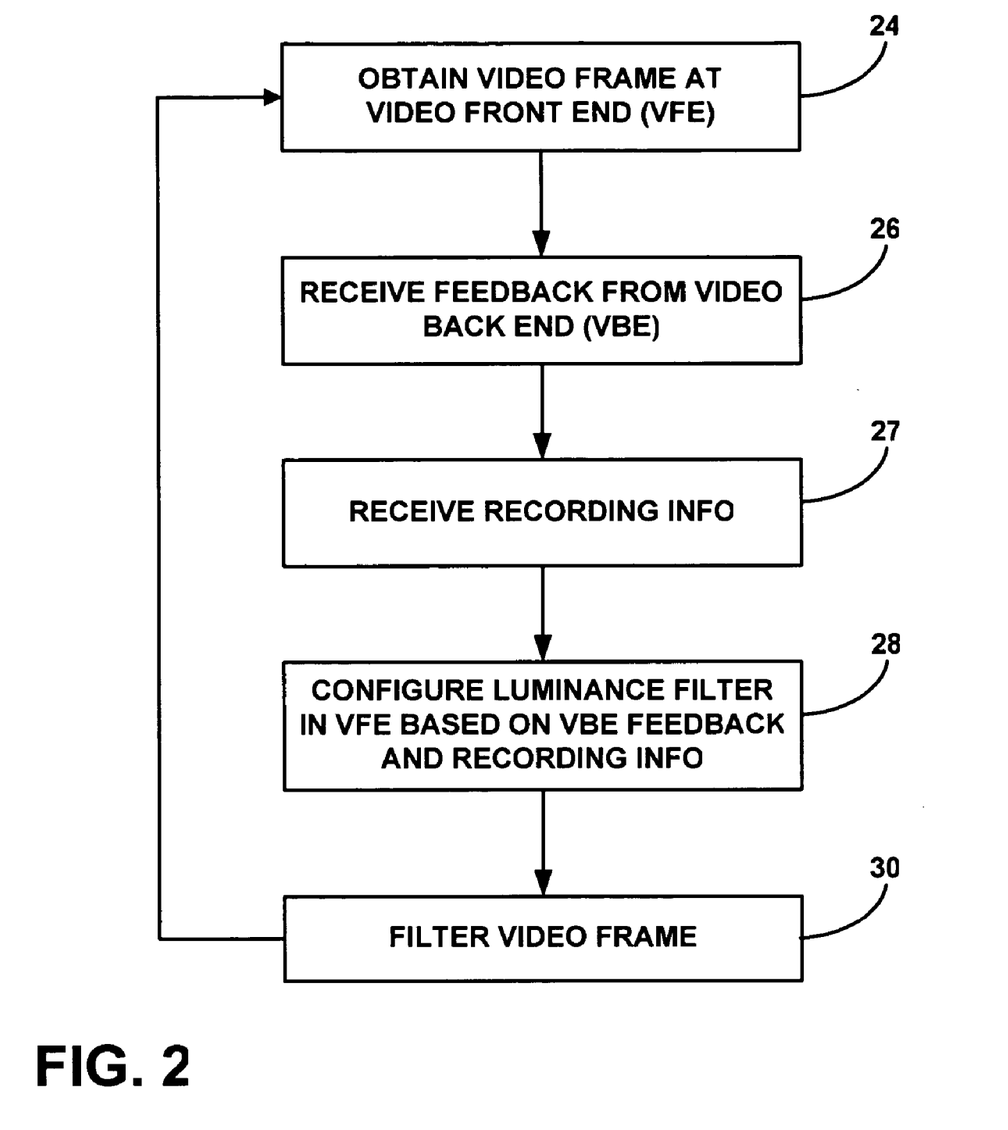
FIG. 2 is a flow diagram illustrating example operation of the video recording system of FIG. 1.

FIG. 2 is a flow diagram illustrating operation of the video recording device of FIG. 1. As shown in FIG. 2, VFE 12 obtains a video frame (24) via video sensor 18. Control unit 23 receives performance feedback from VBE 14 (26), receives recording information from recording settings unit 34, and configures luminance filter 16 based on the VBE feedback and the recording information (28). VFE 12 then applies luminance filter 16 to pre-filter the video frame (30), and passes the pre-filtered video frame to VBE 14, e.g., for encoding by video encoder 20. As described previously, control unit 23 may be configured to adjust luminance filter 16 to enhance video encoding performance by reducing the amount of bit-rate overflow and/or underflow in video encoder 18, enhancing subjective visual quality of the encoded video, or both, based on VBE performance feedback.

Figure 3:
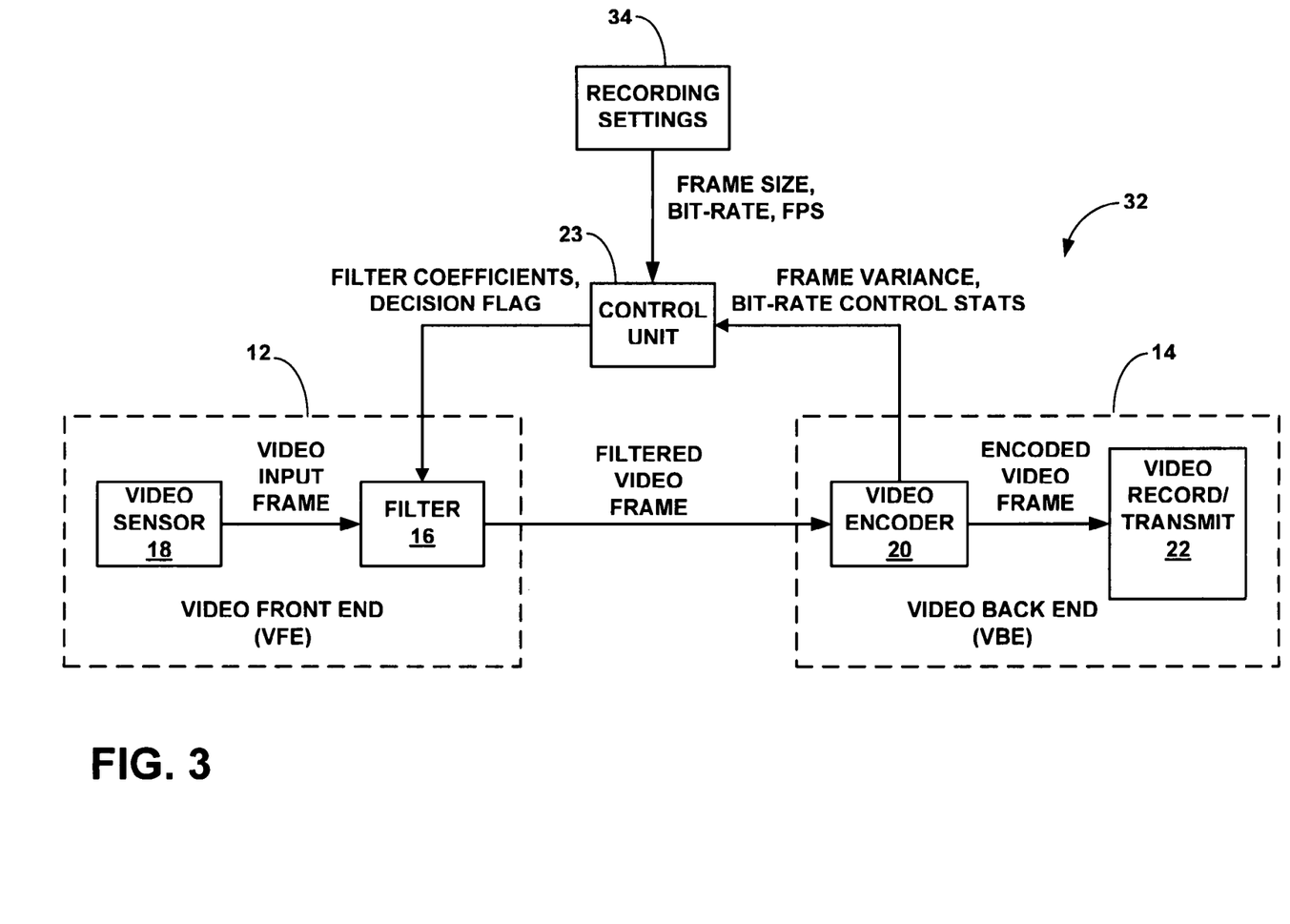
FIG. 3 is a block diagram illustrating a video recording system with a filter that is adjusted in response to video encoder performance information and recording information to reduce bit-rate overflow and/or underflow.

FIG. 3 is a block diagram illustrating a video recording system 32 with a filter 16 that is adjusted in response to both video encoder performance information and recording information to reduce bit-rate overflow and/or underflow. Video recording system 32 substantially conforms to video recording system 10 of FIG. 1, but is more specifically configured to reduce bit-rate overflow and/or underflow in video encoder 20. For convenience, the same reference numerals are used for similar components within video recording system 32 of FIG. 3 and video recording system 10 of FIG. 1. To reduce the amount of bit-rate overflow and/or underflow, video recording system 32 includes a configurable or fixed luminance filter 16 that may be selectively adjusted and/or selectively applied in response to encoder performance information and recording information.

As shown in FIG. 3, video recording system 32 includes VFE 12, VBE 14, control unit 23, and recording settings unit 34. As in the example of FIG. 1, recording settings unit 34 indicates the settings selected for recording a video sequence, including video frame size, video encoding bit-rate, and frame rate in frame per second (fps). Control unit 23 receives the recording settings from recording settings unit 34, and obtains VBE feedback from VBE. 14. The VBE feedback includes encoder performance information such as frame variance and bit-rate control statistics. The frame variance information indicates an amount of spatial complexity content in one or more frames encoded by video encoder 20. The bit-rate control statistics indicate a number of encoding bits applied by the encoder 20 for a previously encoded frame in excess of a bit-rate threshold, i.e., in excess of the video encoding bit-rate specified by recording settings unit 34. The frame variance and bit-rate control information provided to control unit 23 may be expressed as absolute values or index values.

Luminance filter 16 is configured as a digital filter. Control unit 23 may adjust the characteristics of filter 16 by adjusting filter coefficients. In other embodiments, control unit 23 may adjust the characteristics of filter 16 by selecting one or more different filters from a bank of filters. In this case, each filter in the filter bank has different characteristics, e.g., ranging from high-pass, to pass-through, to low-pass filter. Control unit 23 may adjust luminance filter 16 on a frame-by-frame basis, i.e., for each video frame handled by filter 16. For each video frame, control unit 23 may determine both the filter coefficients to be used by the luminance filter 16, as well as whether or not the filter will be applied to the luminance component of the next video frame. The decision of whether or not to apply filter 16 may be represented by a decision flag generated by control unit 23. In other embodiments, the characteristics of filter 16 may be fixed, i.e., not adjusted. Hence, in various embodiments, filter 16 may be selectively adjusted and applied to all video frames, selectively adjusted and selectively applied to only some frames, or fixed and selectively applied to some frames. In addition, if applicable, selective adjustment may be accomplished by adjusting coefficients of the filter or selecting a filter from a bank of filters having different characteristics.

The determination of filter characteristics and/or whether to apply the filter to a given frame is based on the recording settings information and the VBE feedback indicating the encoder performance information. If recording settings and encoder performance are favorable, control unit 23 may determine not to apply filter 16 at all for a given video frame or set of video frames. In this case, recording settings and encoder performance indicate that there is a relatively low amount of bit-rate overflow and frame skipping, and that the resulting encoded video does not produce excessive jerkiness or other artifacts.

If recording settings, encoder performance, or both are less favorable, control unit 23 may determine that filter 16 should be applied to the next video frame or set of video frames. In this case, recording settings or encoder performance indicate the need for application of the filter due to excessive bit-rate overshoot and resulting frame skipping, which can produce artifacts that undermine the quality of the video. The filter 16 may be applied with fixed characteristics. Alternatively, control unit 23 may adjust the filter coefficients of filter 16, or select a filter with particular characteristics from a bank of filters. In either case, filter 16 reduces the complexity of the video frame, e.g., by low pass filtering the video content, to reduce bit-rate overflow in video encoder 20.

In one embodiment, luminance filter 16 is fixed as a low-pass filter and only the decision of whether or not to filter the luminance component of the video frame is made configurable. As an illustration, luminance filter 16 may use the following fixed filter coefficients:

$$([1\ 1\ 1\ 1\ 0\ 1\ 1\ 1\ 1]*a+[-1\ -1\ -1\ -1\ 8\ -1\ -1\ -1\ -1]*b)/(8*a), \text{ where } a=8 \text{ and } b=5.$$

The above coefficients result in a 3×3 spatial filter kernel that forms a low-pass filter with fixed characteristics. The only decision made by control unit 23 is whether to apply the filter 16 or not, given the recording settings and encoder performance information. In other embodiments, both the decision to apply the filter 16 and the coefficients of the filter are configurable, e.g., on a frame-by-frame basis or once for each Intra (I) Period, as will be described below.

Control unit 23 relies in part on the recording settings specified by recording settings unit 34 for video recording system 32 to determine whether or not the adaptive luminance filter 16 should be applied. The recording settings unit 34 may specify recording settings that can be adjusted by a user of system 32 or an application running on system 32. For example, a user or application may select high quality, medium quality or minimum quality recording. If recording settings 34 are set for high quality recording, e.g., as indicated by large frame size, high encoding bit rate, high frame per second (fps) setting, or a combination thereof, it may be preferred to disengage the adaptive luminance filter 16 completely to avoid loss of desirable video information. Low-pass filtering of the luminance component of the input frame can reduce video complexity but introduce artifacts, such as blurring, which may become more visible in high quality recordings, particularly in cases where video encoder 20 does not introduce many visible artifacts of its own.

For medium or lower quality recording settings, an initial decision to turn the adaptive luminance filter on or off 16 may be made based on the amount by which the video sequence needs to be compressed. According to one embodiment, after an initial decision to apply or not apply the filter 16 is made, all frames for an entire Intra (I) Period are either filtered or not according to the initial decision. An I Period refers to the interval between two successive Intra (I)-coded frames, which contains Inter (P or B)-coded frames. Hence, the decision to apply filter 16 may be made on a frame-by-frame basis for each frame in a video sequence or, in this embodiment, on an I Period-by-I Period basis so that every frame in a given I Period has the same filter decision made for it.

VBE 14 may collect two sets of statistics during each Intra Period for use by control unit 23 in determining whether to apply the luminance filter 16 to the video frames in the next Intra Period. As the first set of statistics, video encoder 20 generates bit-rate control statistics, indicating the amount of bits being used by the video encoder 20 versus the amount of bits needed per the target bit-rate. As the second set of statistics, video encoder 20 generates frame variance statistics indicating the spatial complexity of the video frames in the Intra-Period. Control unit 23 relies on the frame variance and bit-rate control statistics, in combination with the recording settings, to determine whether to apply filter 16 and, optionally, to dynamically adjust the characteristics of filter 16.

The frame variance statistics form the basis of a visual masking technique. According to the visual masking technique, high spatial complexity content in a video frame can mask video encoding artifacts. Some regions of a frame (or an entire frame) may include a large amount of high spatial complexity content, such as objects with many edges and ridges. In regions or frames with high spatial complexity content, some amount of the artifacts introduced by the lossy quantization process, such as blockiness and blurriness, can either be completely missed by the human eye or less noticeable to the viewer. Hence, applying the filter 16 to eliminate this type of generally invisible or barely noticeable information may do little or no harm to visual quality, but serve to reduce complexity and thereby reduce bit-rate overflow in video encoder 20. The statistic used by control unit 23 to indicate the amount of high spatial complexity content in a frame is the frame variance.

Assuming that the recording information does not indicate a high quality recording setting, resulting in disablement of the adaptive pre-filter, control unit 23 determines whether to apply the filter based on the VBE feedback. At the end of an Intra Period, before the next I-frame is coded, for example, control unit 23 uses the bit-rate control statistic and the frame variance statistic to determine whether the next Intra Period of frames should be passed through the adaptive luminance filter 16 or not. In this example, control unit 23 simply determines whether the bit-rate control statistic is greater than a pre-determined threshold, and whether the frame variance statistic is greater than another pre-determined threshold. If both of the thresholds are exceeded, the frames for the next Intra Period are passed through the luminance filter 16 in an effort to reduce bit-rate overflow in video encoder 20. In particular, luminance filter 16 operates as a low-pass filter to reduce the complexity of the video frames, and thereby reduce the number of encoding bits required by video encoder 20. The particular threshold levels for bit-rate overflow and variance may be subject to variation and selection by a designer of system 32.

If one or both of the thresholds are not exceeded, video encoder 20 directly encodes the frames in the next Intra Period without any pre-filtering by luminance filter 16. In other words, control unit 23 disables luminance filter 16 for the next Intra Period if bit-rate overflow is not greater than a pre-determined threshold. Hence, luminance filter 16 is applied on an adaptive basis when necessary to reduce excessive bit-rate overflow in encoder 20, and particularly when variance statistics reveal that filtering will not have an adverse impact on quality. As mentioned previously, in addition to determining whether to apply filter 16, the characteristics of filter 16 may be fixed or variable. The effect of control unit 23 on the coding efficiency of the video encoder 20 is reduced by timing the decision so as to coincide with the next I-frame. Because the I-frame does not depend on any other frame in the video sequence (unlike an Inter-coded P-frame or B-frame), the coding effect due to the possible change in the luminance component of the current frame from the previous frame due to filtering by filter 16 is avoided.

Figure 4:
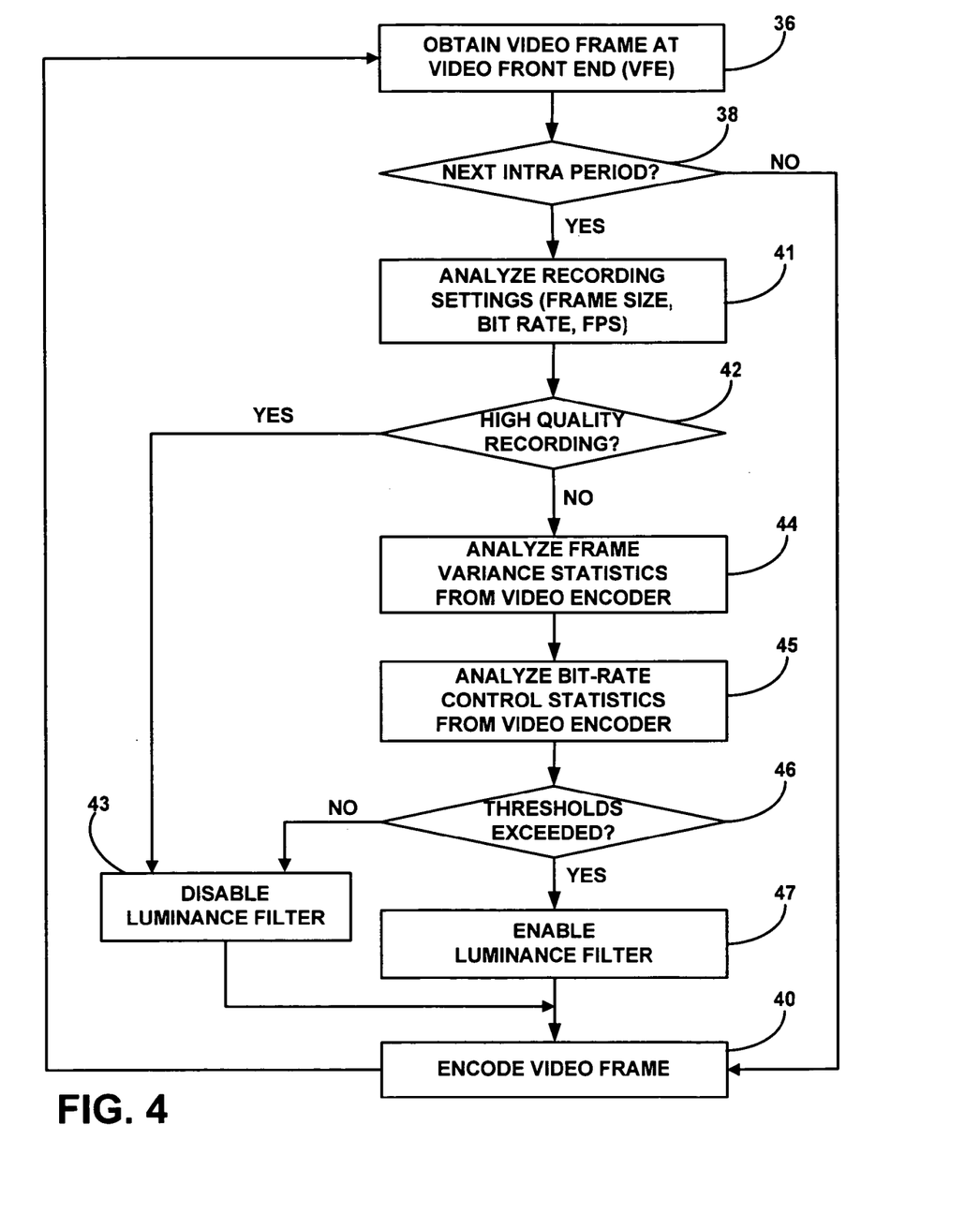
FIG. 4 is a flow diagram illustrating example operation of the video recording system of FIG. 3.

FIG. 4 is a flow diagram illustrating operation of the video recording system 32 of FIG. 3. As shown in FIG. 4, VFE 12 obtains a video frame (36). Control unit 23 determines whether the video frame is part of a current Intra-Period or the start of a new Intra-Period (38). If the frame is not part of the next Intra-Period, control unit 23 does not alter the status of luminance filter 16. Instead, the then-current status of luminance filter 16 (enabled or disabled) is maintained, and video encoder 20 encodes the resulting frame (40). The current status of luminance filter 16 is maintained for each frame in the current Intra Period.

If the frame will be coded as an I-frame, signifying the start of the next Intra Period, control unit 23 determines whether to apply luminance filter 16 or not. In the example of FIG. 4, control unit 23 obtains recording settings, such as frame size, bit rate, and frame rate (40), which indicate the relative quality level of the recording. For example, a large frame size, high bit rate, or high frame rate may indicate that high quality video recording has been selected by the user or an application. If the recording settings indicate that high quality recording has been selected (42), control unit 23 disables luminance filter 16 for the next I period (43) and proceeds to encode the video frame (40). In this case, all frames in the next I period will not be pre-filtered by luminance filter 16, which is disabled, prior to encoding by video encoder 16. Upon encoding the frame, video recording system 32 proceeds to obtain the next video frame at VFE 12 (36).

If the recording settings indicate that high quality recording has not been selected (42), control unit 23 may permit application of filter 16, subject to analysis of frame variance and bit-rate overflow. To that end, control unit 23 analyzes frame variance statistics (44) and bit-rate control statistics (45) from video encoder 20. If the frame variance and bit-rate control statistics exceed the applicable thresholds (46), control unit 23 enables the luminance filter 16 for the next Intra Period (47). Bit-rate control statistics in excess of the applicable threshold indicate bit-rate overflow and the need for application of filter 16. Frame variance statistics in excess of the applicable threshold indicate the presence of high spatial frequency components that can be eliminated by filter 16 without adversely affecting visual quality. In some embodiments, the decision to apply filter 16 may be based on separate threshold comparisons or on a weighted function that combines bit-rate control statistics and frame variance statistics.

If both frame variance and bit-rate control statistics exceed applicable thresholds, and high quality recording is not selected, control unit 23 applies filter 16 to the next frame. Alternatively, if high quality recording is selected or neither threshold is exceeded, filter 16 is not applied to the next frame. If high quality recording is not selected, and only one of the thresholds is exceeded, in some embodiments, control unit 23 may be configured to apply filter 16 if the one threshold is exceeded by a large amount.

In other embodiments, as mentioned above, the filter decision may be based on a weighted function of the frame variance and bit-rate control statistics. Upon pre-filtering of the video frame by filter 16, video encoder 20 proceeds to encode the filtered frame (40). Upon encoding the frame, video recording system 32 proceeds to obtain the next video frame at VFE 12 (36). In this example, luminance filter 16 remains enabled for all video frames in the new Intra Period. In other embodiments, application of luminance filter 16 may be determined on a frame-by-frame basis rather than once per Intra Period. Upon detection of each new Intra Period (38), the process of determining whether to apply filter 16 for frames in that Intra Period is repeated.

With the application of an adaptive luminance pre-filter 16, as described herein, bit-rate overflow may be substantially reduced with little or no cost in the amount of skipped frames for extremely complex video sequences and a slight increase in the amount of skipped frames for ordinary video sequences. The bit-rate overflow reduction may be greater for video sequences with a high amount of motion and high spatial complexity content and at lower bit-rates. Bit-rate overshoot can be defined as a percentage by which a recorded video clips exceeds an ideal video clip size based on applicable recording settings and video clip length. To achieve a reduction in bit-rate overflow by application of filter 16, there may be a slight loss in peak signal-to-noise ratio (PSNR) for some frames. However, the impact of bit-rate overflow reduction on encoder performance generally outweighs the PSNR loss.

Figure 5:
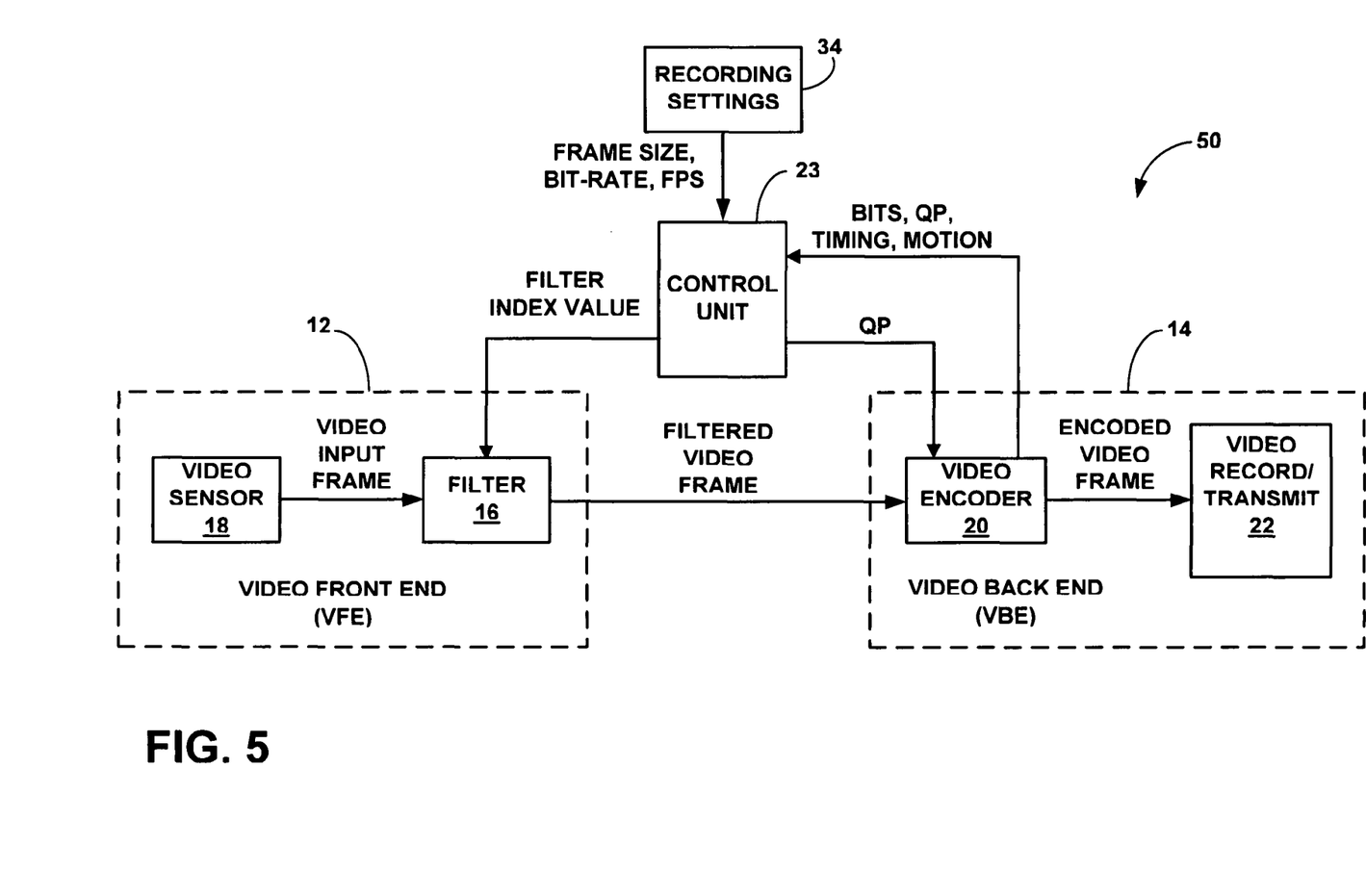
FIG. 5 a block diagram illustrating a video recording system with a filter that is adjusted in response to video encoder performance information and recording information to enhance subjective visual quality.

FIG. 5 a block diagram illustrating a video recording system 50 with a filter 16 that is adjusted in response to performance of video encoder 20 to enhance subjective visual quality. Video recording system 50 substantially conforms to video recording system 10 of FIG. 1, but is more specifically configured to enhance subjective visual quality of video encoded by video encoder 20. For convenience, the same reference numerals are used for similar components within video recording system 50 of FIG. 5 and video recording system 10 of FIG. 1. To enhance subjective visual quality, video recording system 32 includes a luminance filter 16 that may be selectively adjusted in response to encoder performance information to enhance subjective visual quality.

Due to the presence of motion variation and dynamic scene changes in a video sequence, video encoder 20 needs to adjust quantization parameter (QP) information from frame to frame in order to maintain a substantially constant bit-rate. The QP information may include one or more QP values for frame-level or macroblock (MB)-level rate control. For example, one or more QP values may be used with MB-level rate control. In MPEG-4, the QP value range is from 1 to 31. In ITU H.264, the QP range is from 0 to 51. In each case, the QP range covers a range extending from low coding loss (low quantization error) to high coding loss (high quantization error). When video encoder 20 is using a high QP value, the large quantization error of discrete cosine transform (DCT) coefficients could introduce ringing artifacts at high spatial frequency component and block artifacts at block boundaries. To improve subjective video quality, filter 16 may be applied to smoothen edges within the video frame by low pass filtering prior to encoding.

The low pass pre-filtering provided by filter 16 reduces the high spatial frequency components of the video frame. As a result, the QP information, e.g., one or more QP values, for that frame can be reduced by encoder 20, thereby resulting in less coding artifacts. On the other hand, sharp video frames are desirable if coding artifacts are imperceptible. In other words, the input to video encoder 20 can be edge enhanced by high pass filtering in situations where the video encoder is using a low QP value. Video recording system 50 incorporates adaptive luminance pre-filter 16 as part of VFE 12 to adjust the video frame characteristics to fit the requirements of video encoder 20 to enhance the performance of the video encoder.

Application of filter 16 is relatively simple to implement in software and can easily fit into existing VFE hardware design, possibly without any hardware changes. In addition, control of adaptive luminance filter 16 can be integrated with the rate control applied by video encoder 20 to provide stable and robust performance. Luminance filter 16 also may reduce bit-rate overflow for high motion or high texture video sequences. In particular, control unit 23 may select a low-pass filter (LPF) setting for filter 16 to reduce the frame bits or frame QP when high motion or high texture is present in the frames to be encoded by encoder 20.

In the example of FIG. 5, filter 16 is adjusted by selecting a filter from a bank of filters using a filter index value generated by control unit 23. The filters in the filter bank range from a low-pass filter at one end and to a high-pass filter at the other end, and are selectable according to the filter index value. Control unit 23 controls the QP information applied by video encoder 20 and the filter index used to adjust filter 16. The QP information may be one or more QP values, such as a single QP value for an entire frame or multiple QP values for an entire frame or videoblocks, such as macroblocks (MBs), within a frame. Control unit 23 generates the QP information and filter index value based on information received from VBE 14 relating to the bitstream encoded by video encoder 20. In particular, control unit 23 generates the QP information and filter index value for the next video frame to be encoded based on recording information from recording settings unit 34 and performance feedback from VBE 14 relating to a previously encoded frame or set of frames.

Control unit 23 receives recording settings from recording settings unit 34. The settings may include video frame size, video encoding bit-rate, and frame rate in frames per second (fps). As in the examples of FIGS. 1 and 3, if high quality recorded is indicated by frame size, bit-rate, or frame rate, control unit 23 may suspend application of filter 16 for the next frame or a set of frames. Otherwise, filter 16 may be applied with characteristics determined by control unit 23. Control unit 23 also may receive VBE feedback information indicating the number of bits used to encode each frame, the QP value or values for the previously encoded frame, timing information, and motion activity. Based on this information, control unit 23 selects the QP value or values for the next frame to be encoded, and maps the QP information to a filter index value to be used for the next frame to be encoded.

As one example, control unit 23 may select a QP value for the next frame and map the QP value to a filter index value for the next frame. The timing information indicates the amount of time that has elapsed between encoding of the current frame and the previous frame. If the time between successive frames is relatively short, motion control unit 23 may apply a smoothing filter to reduce the complexity of the frame to be encoded. The motion activity information indicates the motion between the previous frame and the current frame. In general, the greater the motion activity is for a frame, the greater the difficulty in predicting the frame. Hence, control unit 23 may favor a frame smoothing filter rather than a frame sharpening filter when there is substantial motion between successive frames.

Using this information from the previously encoded frame, control unit 23 selects the QP value and the filter index value for the next frame to be encoded. For example, using the bit-rate control statistics, QP value, timing information, and motion activity for the previous frame, control unit 23 selects the QP value for the next frame. With less motion activity and less bit-rate overflow, a lower QP value is needed. The QP value generally increases with increased motion activity and bit-rate overflow. Likewise, if the timing interval between frames is lower, the QP value will tend to be higher. For example, if the same scene is recorded using two different frame rates, e.g., 30 fps and 15 fps, the higher frame rate will result in a shorter time interval between frames, and generally require a higher QP value. Further, if there are varying time intervals in a clip due to factors such as variable sensor capture rate or frame skipping to avoid bit-rate overflow, the timing information will change, resulting in different QP values.

Using the QP value determined according to the applicable bit-rate control statistics, QP value, timing information, and motion activity for the previously encoded frame, control unit 23 selects the filter index value for the next frame to be encoded. In particular, for each frame size, control unit 23 accesses an applicable QP-to-filter index mapping table. In other words, for a given frame size, the QP-to-filter index mapping table maps a QP value to a filter index value. Using the filter index value, control unit 23 selects a filter and applies it to pre-filter the next video frame that will be encoded by video encoder 20.

For high quality video using low QP values, it is desirable to obtain sharp video frames even though the enhanced high frequency components could slightly increase the overall QP value used for the video clip. When the video encoder 20 uses high QP values, however, annoying artifacts may be produced. A smoothed image could reduce the QP or alleviate the appearance of discontinuous artifacts. Therefore, VFE 12 incorporates adjustable filter 16, which includes a bank of filters. As mentioned above, the filters in the filter bank cover the range of filters including High Pass Filters (HPF), Low Pass Filters (LPF) and pass-through Filters (which do not change the signal) to support the effects of edge enhancement, texture smoothing, and pass through, respectively, on the input video frame.

To reduce the filter frequency response difference of two adjacent filters in the filter bank, a relatively large number of filter sets may be provided in the filter bank. In one example, the filter bank may include fourteen filter sets, and each filter may have nine filter coefficients that form a 3×3 spatial filter kernel. The fourteen filter sets permit gradual changes from frame-to-frame. An example of a 14-filter VFE filter bank may be represented as follows:

([1 1 1 0 1 1 1 1]*$a$+[−1 −1 −1 −1 8 −1 −1 −1 −1]*$b$)/
(8*$a$), where ($a,b$) take the values {(16,3), (8,2),
(8,3), (2,1), (8,5), (4,3), (16,13), (8,7), (2,2),
(4,5), (8,11), (2,3), (4,7), or (1,2)}.

The frequency response difference of two adjacent filter indices is limited to reduce the image residue due to the filter index change from frame to frame. Control unit 23 determines the filter index based on the QP value and image size using a QP-to-filter index mapping table. As an illustration, an example mapping table for MPEG-4 encoding of quarter video graphics array (QVGA) and quarter common intermediate format (QCIF) size video are provided below:

1. QVGA map
   mpg4_qp_to_vfe_filter_qvga_size [32] =
   {
      13, 13, 13, 12, 12,
      12, 12, 11, 11, 11,
      11, 11, 10, 10, 10,
      9, 9, 9, 8, 8,
      8, 8, 8, 7, 6,
      5, 4, 3, 2, 1,
      0, 0
   };
2. QCIF map
   mpg4_qp_to_vfe_filter_qcif_size [32] =
   {
      13, 13, 12, 11, 11,
      10, 10, 9, 9, 9,
      9, 8, 8, 8, 8,
      7, 7, 7, 7, 6,
      6, 6, 5, 5, 4,
      4, 3, 3, 2, 1,
      0, 0
   };

Different maps can be constructed and designed for ITU H.264 and other video encoding techniques, as well as for different image sizes, e.g., VGA.

The purpose of the QP-to-filter index mapping is to enhance edges by high pass filtering if encoding artifacts are imperceptible at low QP, and to reduce the high spatial frequency components by low pass filtering if encoding artifacts dominate the noise at high QP. In other words, filter 16 can be adapted based on QP and encoding conditions to sharpen the video frame by high pass filtering to increase the QP in the low QP case, and smooth the video frame by low pass filtering to reduce the QP in the high QP case. Because the filter coefficients are adaptive to the value of QP, system 40 may be capable of better and more robust performance for a variety of video content. In addition, frame QP deviation may be reduced by applying adaptive filter control. In order to avoid bit-rate overflow in excess of a target rate, the filter index value may be set to be low pass filter type for high texture video. For example, a low pass pre-filtering of luminance by filter 16 may reduce the number of required frame coding bits and/or the frame QP value.

With access to the mapping table and filter bank, control unit 23 may apply frame-based adaptive filter control as represented by the following pseudo code:

```
    if(vfe_filter_idx > mpg4_qp_to_vfe_filter[encoder_qp]) //
    {
            // increase the smoothness degree if filter index is greater than specified
index value for current MPEG-4 QP value
            vfe_filter_idx-- ;
    }
    else if(vfe_filter_idx < mpg4_qp_to_vfe_filter[encoder_qp])
    {
            // increase the sharpness degree if filter index value is less than specified
index value for current MPEG-4 QP value
            vfe_filter_idx++ ;
    }
```

The filter selection scheme described above ensures that the maximum difference between the filter index values for successive frames is less than or equal to one index value to reduce the adjacent frame residue due to the filter change. This filter selection scheme may be readily implemented in software without significantly increasing processing overhead.

For frames with low motion and low texture, and timing that indicates a longer gap between successive frames, control unit 23 selects a high pass filter index value to enhance edges within the frame. Also, if there is significant bit-rate underflow, i.e., encoder 20 requires less than the available number of coding bits, a high pass filter index value may be selected to provide a sharper image. In this manner, encoder 20 receives a more complex image, and will consume more coding bits to approach the applicable bit rate budget and produce higher quality video. When frame motion or texture is high, or timing indicates a shorter gap between successive frames, control unit 23 may increase the QP value, which could result in the introduction of noticeable artifacts. To maintain visual image quality, control unit 23 changes the filter index value over a series of frames to gradually change the filter to a low pass filter type. As the filter type changes to low pass, filter 16 gradually smoothes the image in the video frames and causes lower frame QP values. With adaptive pre-filtering by filter 16, frame QP deviation can be reduced to provide more consistent image quality.

For medium motion and high textures, with medium timing gaps between successive frames, the average frame QP tends to be high, causing large coding artifacts at low coding bit rates. In this case, control unit 23 applies a low pass filter index value to filter 16 for the video sequence, permitting a lower QP value so that blockiness and coding artifacts can be reduced. In addition, application of the adaptive filter 16 can reduce bit-rate overflow in encoder 20. As the data rate increases, control unit 23 may select high pass filter index values for filter 16 for some frames to enhance the subjective visual image quality. In general, filter 16 may change from high-pass to pass-through to low pass on a gradual basis over the course of several frames as determined by the then-current video encoding conditions, e.g., image size, frame bits, and motion information. Similarly, the QP value used by video encoder 20 may change over several frames as a function of the filter index value and the encoding conditions.

Figure 6:
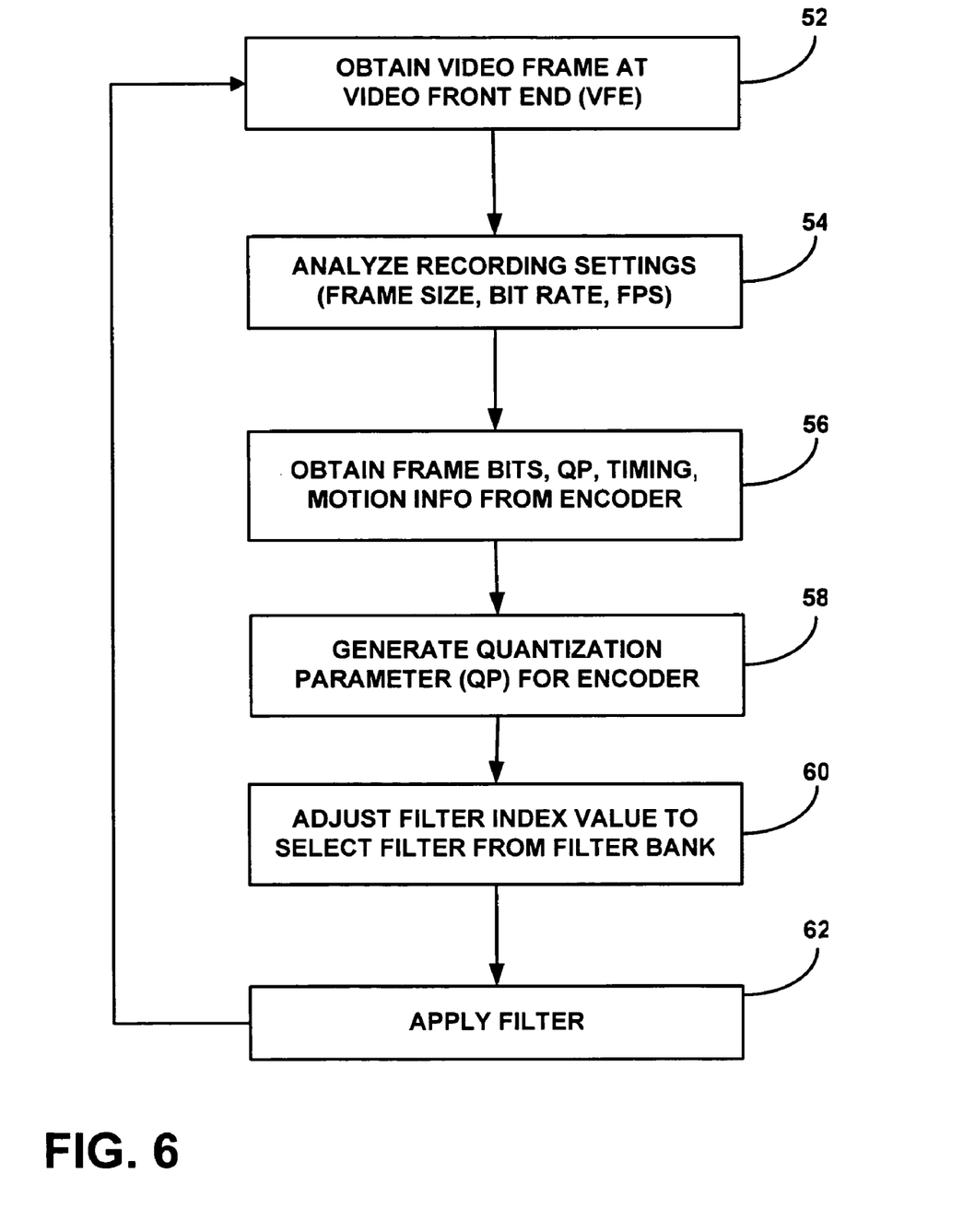
FIG. 6 is a flow diagram illustrating example operation of the video recording system of FIG. 5.

FIG. 6 is a flow diagram illustrating example operation of the video recording system 50 of FIG. 5. As shown in FIG. 6, VFE 12 obtains an input video frame via video sensor 18 (52). Control unit 23 obtains recording settings including frame size, target bit rate, and frame rate (fps) (54). Control unit 23 also obtains the number of coding bits used by video encoder 20 for the previous frame, the QP value used for the previously encoded frame, timing information indicating the amount of time elapsed between the previous and current frames, and motion information indicating motion activity between the previous and current frames from VBE 14 (56). Based on this information, control unit 23 adjusts the QP value used by encoder 20 to encode the next video frame (58). In addition, control unit 23 maps the QP value to a filter index value to select a filter from the filter bank for application as luminance pre-filter 16 (60). Hence, the QP value and filter index value are interdependent, with the filter index value being determined as a function of the QP value. In turn, the filter index value influences the QP value for the next frame. In alternative embodiments, control unit 23 may select the filter index value first and map the filter index value to a QP value.

As described previously, in some embodiments, control unit 23 may adjust filter index value by no more than one step per frame in order to provide gradual filter adaptation, and reduce frame residue between adjacent frames. Upon selection of the filter index value, filter 16 is applied to pre-filter the current video frame prior to encoding by video encoder 20 (62). Depending on conditions, control unit 23 may gradually adjust filter 16 over a series of frames by selecting filters from the filter bank according to the filter index values, which produce different gradations of high pass, pass-through and low-pass filters. Upon application of filter 16 (62), VFE 12 obtains the next input video frame (52), and operation of video recording system 50 continues on an iterative basis. Over the course of a video sequence, control unit 23 adaptively adjusts the QP value and the characteristics of filter 16 in VFE 12 based on feedback from VBE 14 to enhance or maintain subject visual quality of the video frames encoded by video encoder 20.

Figure 7:
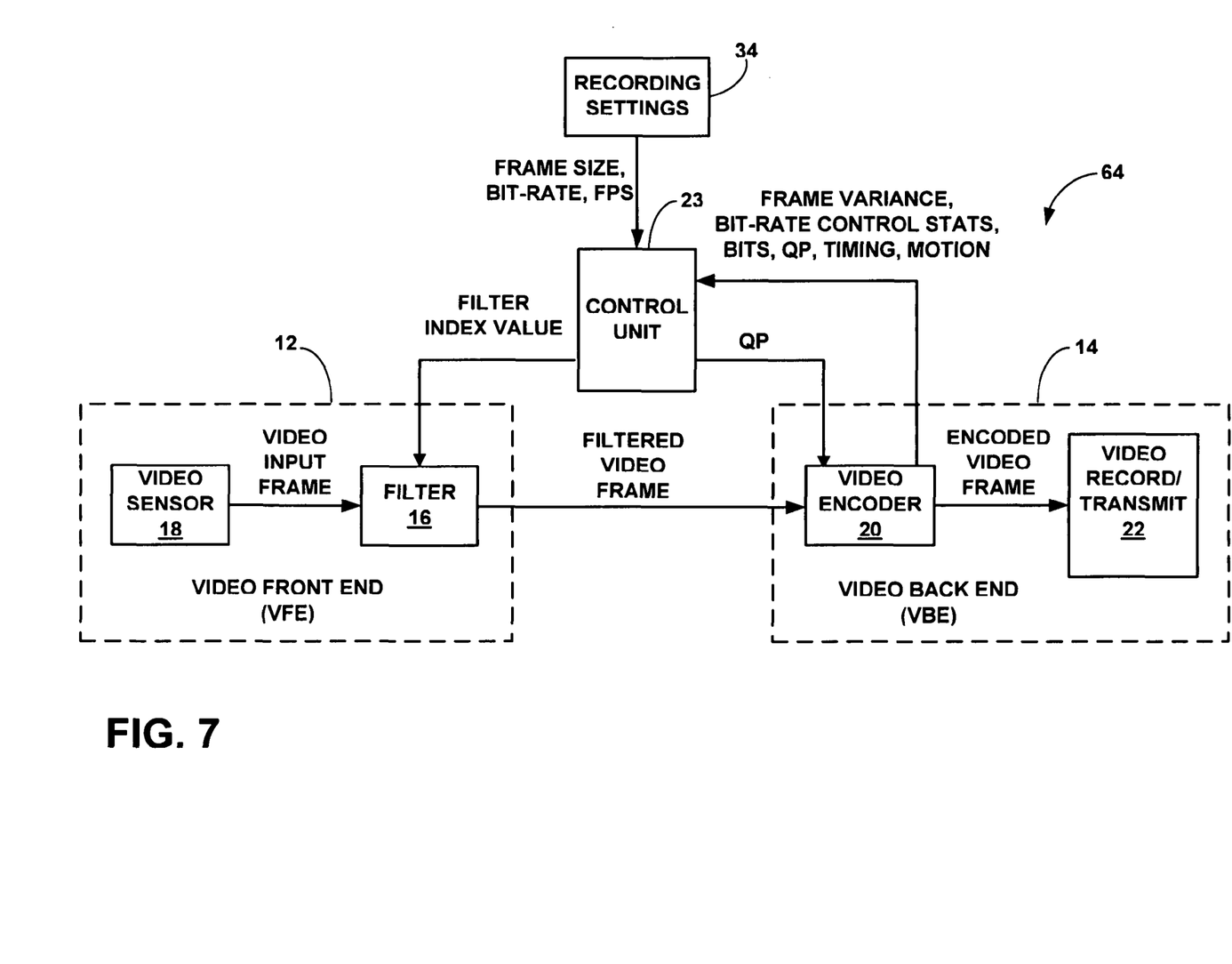
FIG. 7 a block diagram illustrating a video recording system with a filter that is adjusted in response to video encoder performance information and recording information to enhance subjective visual quality and reduce bit-rate overflow and/or underflow.

FIG. 7 is a block diagram illustrating a video recording system 64 with a filter 16 that is adjusted in response to video encoder performance information and recording information to enhance subjective visual quality and reduce bit-rate overflow. In the example of FIG. 3, system 32 is configured to apply adaptive pre-filtering of video information to reduce the amount of bit-rate overflow in video encoder 20. In the example of FIG. 5, system 50 is configured to apply adaptive pre-filtering of video information to enhance or maintain subjective video quality of video frames encoded by video encoder 20. In the example of FIG. 7, video recording system 64 is configured to both reduce bit-rate overflow and enhance or maintain subjective video quality, leveraging the adaptive pre-filtering techniques applied by both system 32 and system 50.

As shown in FIG. 7, control unit 23 receives recording settings from recording setting unit 34. The recording settings may include frame size, target encoding bit rate, and frame rate in frame per second (fps). In addition, control unit 23 receives frame variance statistics, bit-rate control statistics, frame bits, timing information, QP information, and motion activity information as performance feedback from VBE 14.

Using the recording information and VBE performance feedback, control unit 23 adjusts filter 16 and adjusts the QP value used by video encoder 20 for the next video frame to be encoded. As in the example of FIG. 5, control unit 23 may adjust filter 16 by generating coefficient values or filter index values. In the former case, the coefficient values reconfigure the filter 16 as a low-pass, high-pass or pass-through filter. In the latter case, the filter index values are used to select a low-pass, high-pass or pass-through filter from a bank of pre-configured filters. In each case, the result is an adjustment to the characteristics of luminance pre-filter 16.

There are a number of differences between the operation of system 32 of FIG. 3 and system 50 of FIG. 5. In system 32 of FIG. 3, the decision of whether or not to pre-filter the luminance components of incoming video frames using filter 16 is made once every Intra Period. In system 50 of FIG. 5, however, the decision to adjust filter 16 is made on a frame-by-frame basis. In system 50, an adjustment of filter 16 to yield a pass-through filter generally corresponds to a decision not to apply the filter to the current frame. Another substantial difference is the nature of the statistics used to make the decision whether or not to filter a frame. System 32 and 50 both use recording setting as input information for control unit 23. However, the other inputs are quite different. For example, to reduce bit-rate overflow, system 32 makes use of frame variance (i.e., visual masking) and bit-rate control statistics from VBE 14. On the other hand, to enhance or maintain subjective visual quality, system 50 uses the number of bits used for the previous frame, the QP value for the previous frame, timing information between the previous and current frames, and motion information between the previous and current frames from VBE 14 to generate the quantization parameter (QP) value and filter index value for the next frame to be encoded.

Figure 8:
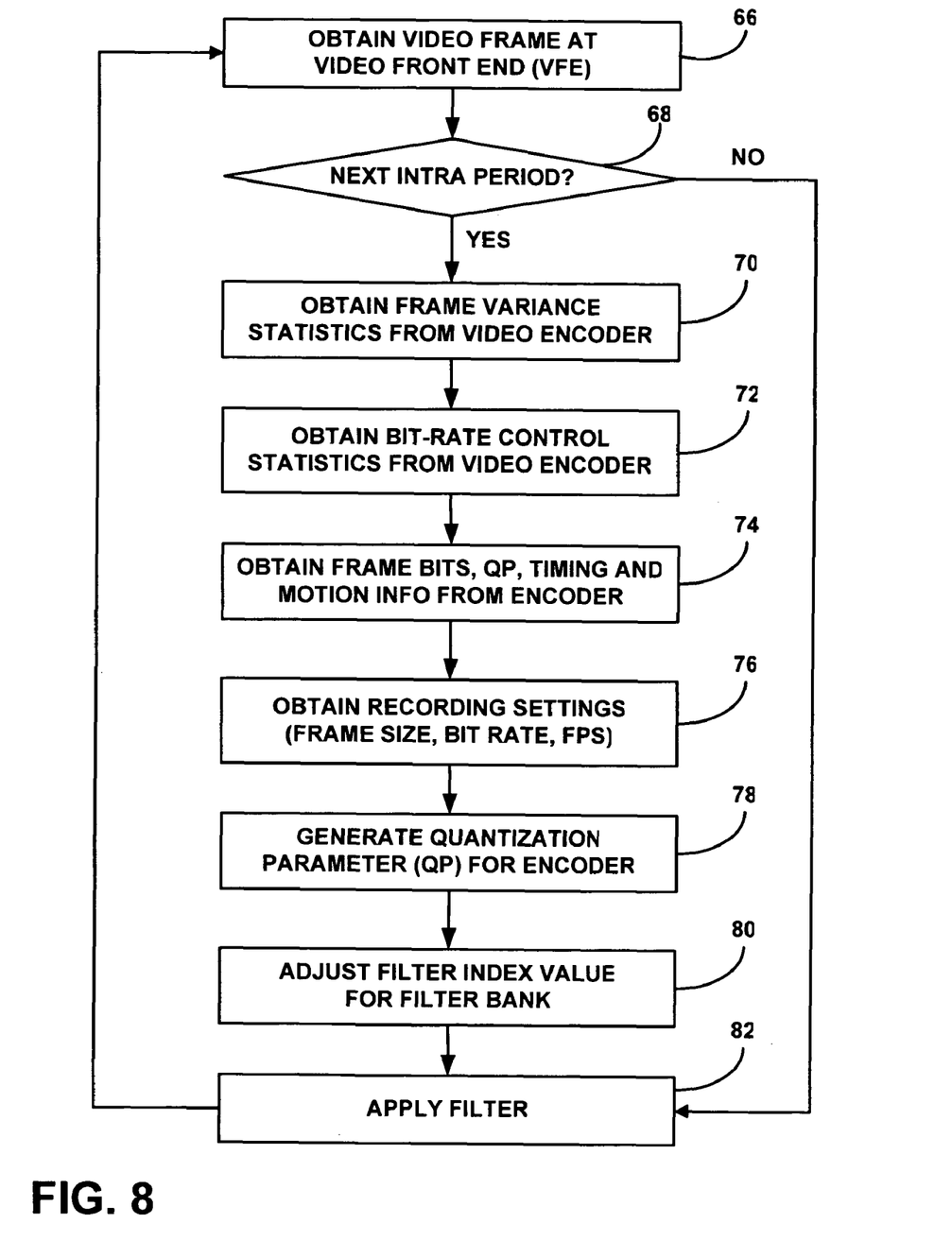
FIG. 8 is a flow diagram illustrating example operation of the video recording system of FIG. 7.

The combined adaptive luminance pre-filter in video recording system 64 of FIG. 7 integrates three different features to achieve reduction of bit-rate overflow and enhancement or maintenance of subject visual quality. Specifically, system 65 may include a luminance filter bank or adjustable filter for selection of different filters to adjust the characteristics of luminance filter 16. In addition, control unit 23 may be configured to make the filter decision either on a frame-by-frame basis or once every Intra Period. Control unit 23 further makes use of a combined set of inputs including recording settings, frame variance and bit-rate control statistics, and frame bits, QP value, timing information and motion information. The operation of system 64 may be represented by the following pseudo code:

Period (68), control unit 23 adjusts the characteristics of filter 16. In particular, control unit 23 obtains frame variance statistics (70) and bit-rate control statistics (72) from video encoder 20 in VBE 14. In addition, control unit 23 obtains frame bits, QP information, timing information and motion information from video encoder 20 (74) for the previously encoded frame, and obtains recording settings, such as frame size, bit rate and frame rate (fps) from recording settings unit 34 (76). Using this collection of information, control unit 23 adjusts the QP value to be used by video encoder 20 to encode the next frame (78) and adjusts the filter index value to select a filter from the filter bank (80) for application as filter 16 to frames over the next Intra Period. Filter 16 is then applied to the current frame (82) to be encoding to provide luminance pre-filtering. During an existing Intra Period (68), the filter index value may be fixed.

Control unit 23 may select the QP value based on the frame bits, size and motion information from VBE 14. Control unit 23 then applies the QP value and the frame variance and bit-rate control statistics to a filter index value. As indicated in the above pseudo code, if the current filter index value is less than the specified index value produced by the QP-to-filter index value map or the bit-rate control statistics indicate that this is bit-rate overflow in video encoder 20, control unit 23 adjusts the filter index value toward the low pass filter end of the filter bank to increase the smoothness of the video frame. In this manner, the complexity of the input video frame can be reduced to reduce bit-rate overflow in video encoder 20. If the current filter index value is less than the index value specified by the QP-to-filter index value map, however, control unit 23 adjusts the filter index value toward the high pass filter end of the filter bank to increase the sharpness of the video frame prior to encoding by video encoder 20.

The techniques described herein may be implemented in hardware, software, firmware, or any combination thereof. If implemented in software, the techniques may be directed to a computer-readable medium comprising program code providing machine-executable instructions, that when executed in a device that captures images, performs one or more of the techniques described herein. In that case, the computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, and the like.

The program code may be stored on memory in the form of computer readable instructions. In that case, a processor such

```
if(vfe_filter_idx > mpg4_qp_to_vfe_filter[encoder_qp] OR encoder overflow)
    {
        // increase the smoothness degree if the filter index value is greater than the
specified index value for the current MPEG-4 QP value or there is bit-overflow in the video
encoder
        vfe_filter_idx-- ;
    }
    else if(vfe_filter_idx < mpg4_qp_to_vfe_filter[encoder_qp])
    {
        // increase the sharpness degree if the filter index value is less than the
specified index value for the current MPEG-4 QP value
        vfe_filter_idx++ ;
    }
```

FIG. 8 is a flow diagram illustrating example operation of the video recording system 64 of FIG. 7. As shown in FIG. 8, VFE 12 obtains a video frame via video sensor 12. If the video frame is to be intra-coded, signifying the start of the next Intra as a microprocessor or digital signal processor (DSP) may execute instructions stored in memory in order to carry out one or more of the techniques described herein. In some cases, the techniques may be executed by a DSP that invokes various hardware components. In other cases, the techniques described in this disclosure may be implemented by a microprocessor, one or more application specific integrated circuits (ASICs), one or more field programmable gate arrays (FPGAs), or some other hardware-software combination.

Various embodiments have been described for purposes of illustration. Although use of a luminance pre-filter has been described, other embodiments may encompass the use of luminance and/or chrominance pre-filters alone or in combination with one another. These and other embodiments are within the scope of the following claims.

The invention claimed is:

1. A method comprising:
applying a filter to a first video frame;
applying a video encoder to encode the first filtered video frame;
receiving performance information relating to the encoding of the first filtered video frame, wherein the performance information indicates that the video encoder used less than all of a bit rate budget to encode the first filtered video frame;
adjusting the filter, based on the performance information indicating that the video encoder used less than all of the bit rate budget to encode the first filtered video frame, to cause the filter to high pass filter a second video frame following the first video frame, such that quality of the second filtered video frame is increased relative to the unfiltered second video frame; and
applying the video encoder to encode the second filtered video frame.

2. The method of claim 1, further comprising:
receiving a second set of performance information relating to the encoding of the second filtered video frame;
adjusting the filter based on the second set of performance information;
receiving a third video frame; and
applying the adjusted filter to the third video frame.

3. The method of claim 1, wherein receiving a video frame includes receiving a plurality of video frames, the method further comprising:
inter-encoding video frames in an intra-period extending between successive intra-encoded frames,
wherein adjusting the filter includes adjusting the filter at most once per intra-period.

4. The method of claim 1, wherein the performance information includes frame variance information indicating an amount of spatial complexity content in the frame, and bit-rate control information indicating a number of encoding bits applied by the encoder relative to the bit rate budget.

5. The method of claim 1, wherein the filter includes a luminance filter.

6. The method of claim 1, further comprising obtaining video frame recording information indicating video frame size, encoding bit rate, and frame rate, wherein adjusting the filter includes adjusting the filter based on both the performance information and the recording information.

7. The method of claim 1, wherein adjusting the filter includes adjusting coefficients of the filter.

8. The method of claim 1, wherein adjusting the filter includes selecting one of a plurality of different filters.

9. The method of claim 1, further comprising determining whether to apply the filter or skip application of the filter based on the performance information.

10. The method of claim 1, wherein adjusting the filter includes selecting one of a plurality of filter index values, and adjusting the filter based on the selected index value.

11. A system comprising:
a video sensor that obtains a first video frame and a second video frame following the first video frame;
a filter that filters the first video frame;
a video encoder that encodes the first filtered video frame; and
a control unit that receives performance information relating to the encoding of the first filtered video frame, wherein the performance information indicates that the video encoder used less than all of a bit rate budget to encode the first filtered video frame, and adjusts the filter, based on the performance information indicating that the video encoder used less than all of the bit rate budget to encode the first filtered video frame, to cause the filter to high pass filter the second frame, such that quality of the second filtered video frame is increased relative to the unfiltered second video frame, and
wherein the video encoder encodes the second filtered video frame.

12. The system of claim 11, wherein the video sensor obtains a third video frame, wherein the control unit receives a second set of performance information relating to the encoding of the second filtered video frame, adjusts the filter based on the second set of performance information, and the adjusted filter filters the third video frame.

13. The system of claim 11, wherein the video sensor obtains a plurality of video frames, the video encoder inter-encodes video frames in an intra-period extending between successive intra-encoded frames, and the control unit adjusts the filter at most once per intra-period.

14. The system of claim 11, wherein the performance information includes frame variance information indicating an amount of spatial complexity content in the frame, and bit-rate control information indicating a number of encoding bits applied by the encoder relative to the bit rate budget.

15. The system of claim 11, wherein the filter includes a luminance filter.

16. The system of claim 11, wherein the control unit obtains video frame recording information indicating video frame size, encoding bit rate, and frame rate, and adjusts the filter based on both the performance information and the recording information.

17. The system of claim 11, wherein the control unit adjusts coefficients of the filter.

18. The system of claim 11, wherein the control unit adjusts the filter by selecting one of a plurality of different filters.

19. The system of claim 11, wherein the control unit determines whether to apply the filter or skip application of the filter based on the performance information.

20. The system of claim 11, wherein the control unit selects one of a plurality of filter index values, and adjusts the filter based on the selected index value.

21. A non-transitory computer-readable storage medium comprising instructions to cause a processor to:
apply a filter to a first video frame;
apply a video encoder to encode the first filtered video frame;
receive performance information relating to the encoding of the first filtered video frame, wherein the performance information indicates that the video encoder used less than all of a bit rate budget to encode the first filtered video frame;
adjust the filter based on the performance information indicating that the video encoder used less than all of the bit rate budget to encode the first filtered video frame, to cause the filter to high pass filter a second video frame following the first video frame, such that quality of the second filtered video frame is increased relative to the unfiltered second video frame; and apply the video encoder to encode the second filtered video frame.

22. The non-transitory computer-readable storage medium of claim 21, further comprising instructions to cause the processor to:

receive a second set of performance information relating to the encoding of the second filtered video frame;

adjust the filter based on the second set of performance information; and apply the adjusted filter to a third video frame.

23. The non-transitory computer-readable storage medium of claim 21, further comprising instructions to cause a processor to receive a plurality of video frames, inter-encode video frames in an intra-period extending between successive intra-encoded frames with the video encoder, and adjust the filter at most once per intra-period.

24. The non-transitory computer-readable storage medium of claim 21, wherein the performance information includes frame variance information and bit-rate control information, wherein the frame variance information indicates an amount of spatial complexity content in the frame, and wherein the bit-rate control information indicates a number of encoding bits applied by the encoder relative to the bit rate budget.

25. The non-transitory computer-readable storage medium of claim 21, further comprising instructions to cause the processor to obtain video frame recording information indicating video frame size, encoding bit rate, and frame rate, and adjust the filter based on both the performance information and the recording information.

26. The non-transitory computer-readable storage medium of claim 21, further comprising instructions to cause the processor to adjust coefficients of the filter or select one of a plurality of different filters.

27. The non-transitory computer-readable storage medium of claim 21, further comprising instructions to cause the processor to determine whether to apply the filter or skip application of the filter based on the performance information.

28. The non-transitory computer-readable storage medium of claim 21, wherein the instructions cause the processor to obtain video frame recording information indicating video frame size, encoding bit rate, and frame rate, and adjust the filter based on both the performance information and the recording information.

29. The non-transitory computer-readable storage medium of claim 21, wherein the filter includes a luminance filter.

30. An apparatus comprising:

means for applying a filter to a first video frame;

means for applying a video encoder to encode the first filtered video frame;

means for receiving performance information relating to the encoding of the first filtered video frame, wherein the performance information indicates that the video encoder used less than all of a bit rate budget to encode the first filtered video frame; video encoder; and means for adjusting the filter, based on the performance information indicating that the video encoder used less than all of the bit rate budget to encode the first filtered video frame, to cause the filter to high pass filter a second video frame following the first video frame, such that quality of the second filtered video frame is increased relative to the unfiltered second video frame; and means for applying the video encoder to encode the second filtered video frame.

31. The apparatus of claim 30, further comprising:

means for receiving a second set of performance information relating to the encoding of the second filtered video frame;

means for adjusting the filter based on the second set of performance information;

means for receiving a third video frame; and means for applying the adjusted filter to the third video frame.

32. The apparatus of claim 30, wherein the means for receiving the video frame includes means for receiving a plurality of video frames, further comprising:

means for inter-encoding video frames in an intra-period extending between successive intra-encoded frames, wherein the means for adjusting the filter includes means for adjusting the filter at most once per intra-period.

33. The apparatus of claim 30, wherein the performance information includes frame variance information indicating an amount of spatial complexity content in the frame, and bit-rate control information indicating a number of encoding bits applied by the encoder relative to the bit rate budget.

34. The apparatus of claim 30, further comprising means for obtaining video frame recording information indicating video frame size, encoding bit rate, and frame rate, wherein adjusting the filter includes adjusting the filter based on both the performance information and the recording information.

35. The apparatus of claim 30, wherein the means for adjusting the filter includes means for adjusting coefficients of the filter.

36. The apparatus of claim 30, wherein the means for adjusting the filter includes means for selecting one of a plurality of different filters.

37. The apparatus of claim 30, further comprising means for determining whether to apply the filter or skip application of the filter based on the performance information.

38. The apparatus of claim 30, wherein the means for adjusting the filter includes:

means for selecting one of a plurality of filter index values; and means for adjusting the filter based on the selected index value.

* * * * *